US006937488B2

(12) United States Patent
Eguchi

(10) Patent No.: US 6,937,488 B2
(45) Date of Patent: Aug. 30, 2005

(54) POWER SUPPLY AND METHOD FOR GENERATING SWITCHING SIGNAL FOR TURNING ON/OFF SWITCHING ELEMENT OF CONVERTER UNIT CONSTITUTING POWER SUPPLY

(75) Inventor: Kiyoshi Eguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 106 days.

(21) Appl. No.: 10/416,887

(22) PCT Filed: Jan. 30, 2002

(86) PCT No.: PCT/JP02/00679

§ 371 (c)(1), (2), (4) Date: May 16, 2003

(87) PCT Pub. No.: WO03/065560

PCT Pub. Date: Aug. 7, 2003

(65) Prior Publication Data

US 2004/0252533 A1 Dec. 16, 2004

(51) Int. Cl.[7] .............................................. H02M 7/44
(52) U.S. Cl. ......................................... 363/97; 363/37
(58) Field of Search ............................ 363/37, 34, 66, 363/64, 97, 41, 127, 132, 16, 17, 24; 323/222, 220, 282, 284

(56) References Cited

U.S. PATENT DOCUMENTS 5,045,989 A * 9/1991 Higaki et al. ................. 363/37
6,215,287 B1 * 4/2001 Matsushiro et al. ........ 323/222
6,783,440 B2 * 8/2004 Togawa et al. ............... 451/56

FOREIGN PATENT DOCUMENTS

JP 2001-16856 A 1/2001
JP 2001-86737 A 3/2001
JP 2001-95262 A 4/2001

* cited by examiner

*Primary Examiner*—Rajnikant B. Patel
(74) *Attorney, Agent, or Firm*—Sughrue Mion, PLLC

(57) ABSTRACT

A control circuit calculates, through PI control, the amplitude of a current command per half cycle of an input voltage at a point in time where the sign of the input voltage from the AC power supply 20 detected by an input voltage detector 31 changes based on the difference between a reference voltage command and the voltage of a capacitor detected by a DC voltage detector 30, calculates a normalized current command by dividing the amplitude of the current command by the peak value of the last input voltage and multiplying the resulting value by the input voltage, and generates a switching signal for performing on/off control of a switching element 38 by comparing the current command thus calculated with the input current detected by the input current detector circuit 32.

4 Claims, 10 Drawing Sheets

POWER SUPPLY AND METHOD FOR GENERATING SWITCHING SIGNAL FOR TURNING ON/OFF SWITCHING ELEMENT OF CONVERTER UNIT CONSTITUTING POWER SUPPLY

TECHNICAL FIELD

The present invention relates to a power supply unit and a method for generating a switching signal to perform on/off control of a switching element in a converter of the power supply unit.

BACKGROUND ART

FIG. 7 shows a related art power supply unit.

In the figure, a numeral 20 represents an AC power supply, 21 a switch to switch connection with AC power supply 20, 22 a step-up reactor, 23 a common bus connecting one end of the AC power supply 20 and one end of a load (not shown). A numeral 24 represents an AC-DC converter, 25, 26 diodes, 27 a capacitor connected between a positive pole P and the common bus 23, 28 a capacitor connected between the common bus 23 and a negative pole N, 29 an inverter as a DC-AC converter. A numeral 30 represents a common bus voltage detector circuit for detecting a voltage of capacitors 27, 28, 31 an input voltage detector circuit for detecting a voltage of the AC power supply 20, 32 a current detector circuit for detecting a current of the AC power supply 20, 33 a controller for controlling the AC-DC converter 24.

Numerals 34, 35, 36, 37 represent diodes, 38 a switching element. The diodes 34, 35, 36, 37 and the switching element 38 compose the AC-DC converter 24. The AC-DC converter 24 and the reactor 22 compose a step-up chopper circuit.

A numeral 39 represents a current command generator and 40 a comparator. The current command generator 39 and the comparator 40 compose the controller 33.

Numerals 41, 42 represents switching elements, 43, 44 diodes connected in anti-parallel with the switching elements 41, 42. The switching elements 41, 42 and the diodes 43, 44 compose an inverter 29.

A numeral 45 represents a reactor and 46 a capacitor.

A sign $V_a$ represents an input voltage detection value detected by the input voltage detector circuit 31, $V_{ref}$ a reference voltage command, $V_P$, $V_N$ bus voltage detection values output from the bus voltage detector circuit 30, $i_a$ an input current detection value detected by the current detector circuit 32, $i_2{}^*$ a current command output from the current command generator 39.

FIGS. 8 and 9 explain the operation to recharge capacitors 27, 28 in a conventional power supply unit. In the figures, numerals 20 through 28, 32, and 34 through 38 are the same as those in FIG. 7 an the corresponding description is omitted.

Operation of the conventional power supply unit will be described referring to FIGS. 7 through 9.

In the conventional power supply unit, current command generating means 39 of the controller 33 generates a current command $i_2{}^*$ from the reference voltage command $V_{ref}$ and the bus voltage detection value $V_P$ (or $V_N$) output from the bus voltage detector circuit 30.

A comparator 40 of the controller 33 compares the current command $i_2{}^*$ with the input current detection value $i_a$ detected by the current detector circuit 32, and in case the input current detection value $i_a$ exceeds the current command $i_2{}^*$, turns off the switching signal for turning on/off the switching element 38. In case input current detection value $i_a$ lowers the current command $i_2{}^*$, the comparator 40 turns on the switching signal for turning on/off the switching element 38.

By using the switching signal to turn on/off the switching element 38 of the AC-DC converter circuit 24, the AC power of the AC power supply 20 is converted to a DC power when the switching signal is turned on and energy is stored into the reactor 22 to boost the power via the route shown in FIG. 8 or 9, and the sum of the energy stored in the reactor 22 and the AC voltage of the power supply unit is used to recharge the capacitors 27, 28 when the switching signal is tuned off.

By controlling on/off of the switching elements 41, 42 of the inverter 29, a DC voltage charged on the capacitors 27, 28 is converted to an AC power of a predetermined voltage, and the resulting AC power is output.

Next, the operation of recharging the capacitor 27 in case the AC power supply 20 is positive will be described referring to FIG. 8.

In case the AC power supply 20 is positive, the controller 33 turns on the switching element 38 of the AC-DC converter circuit 24 to store energy into the reactor 22 via the route covering the AC power supply 20, switch 21, reactor 22, diode 34, switching element 38, diode 37, common bus 23, and AC power supply 20 in this order. Then, the controller 33 turns off the switching element 38 to recharge the capacitor 27 using the energy stored into the reactor 22 via the route covering the AC power supply 20, switch 21, reactor 22, diode 25, capacitor 27, common bus 23, and AC power supply 20 in this order.

The operation of recharging the capacitor 28 in case the AC power 20 is negative will be described referring to FIG. 9.

In case the AC power supply 20 is negative, the controller 33 turns on the switching element 38 of the AC-DC converter circuit 24 to store energy into the reactor 22 via the route covering the AC power supply 20, common bus 23, diode 35, switching element 38, diode 36, reactor 22, switch 21, and AC power supply 20 in this order. Then, the controller 33 turns off the switching element 38 to recharge the capacitor 28 using the energy stored into the reactor 22 via the route covering the AC power supply 20, common bus 23, capacitor 28, diode 26, reactor 22, switch 21, and AC power supply 20.

FIGS. 10 and 11 show various waveforms in a conventional power supply unit. FIG. 10 shows a case where a light load is applied while FIG. 11 shows a case where a heavy load is applied. In the figures, A shows the waveform of the amplitude of a current command, B the waveform of a bus voltage, C waveforms of an input voltage and a current command, D waveforms of an output current and an output voltage, and E waveform of an instantaneous output power.

In a conventional power supply unit, as described above, by controlling the time the switching element 38 is turned on/off, the voltages of the capacitors 27, 28 are retained to predetermined values. A switching signal to the switching element 38 is instantaneously controlled so that the bus voltage will follow the reference voltage command. Thus, in case an instantaneous load varies to a great extent although an average load in half cycle is constant, the bus voltage varies in synchronous fashion. Thus, in case a response is made earlier, the input current includes a small ripple. In case the load is light, the variation in the bus voltage is small (FIG. 10B). While the load is increased, the bus voltage includes a large ripple voltage (FIG. 11B).

The negative bus voltage $V_N$ is the same as the positive bus voltage $V_P$ so that the corresponding description is omitted.

As mentioned earlier, in a conventional power supply unit, in case a response is made earlier, a large ripple voltage appears on the bus voltage when an instantaneous load varies widely as the load is gradually increased. Thus an element with a large withstand voltage must be used considering the peak value of a ripple voltage on the bus voltage.

The invention is accomplished in order to solve the problems. The first object of the invention is to provide a power supply unit which allows a bus voltage to follow a reference voltage command while keeping the variation in the bus voltage within a predetermined range regardless of load size.

The second object of the invention is to provide a power supply unit which assures an improved load response and a stable bus voltage even in the presence of an impact load.

DISCLOSURE OF THE INVENTION

A power supply unit of the invention comprises a converter including a diode bridge and a switching element for converting an AC power to a DC power, a step-up reactor which constitutes, together with the converter, a step-up chopper circuit, a capacitor for recharging a DC voltage boosted by the step-up chopper circuit, a control circuit for performing on/off control of the switching element, and an inverter for converting a DC power to an AC power, the power supply unit comprising an input current detector circuit for detecting the input current of an AC power supply, an input voltage detector circuit for detecting the input voltage of the AC power supply, and a DC voltage detector circuit for detecting the voltage of the capacitor, characterized in that the control circuit calculates, through PI control, the amplitude of a current command per half cycle of the AC power supply at a point in time where the sign of the input voltage from the AC power supply changes based on the difference between the reference voltage command and the voltage of the capacitor, calculates a normalized current command by dividing the amplitude of the current command by the peak value of the last input voltage and multiplying the resulting value by the input voltage from the AC power supply, and generates a switching signal for performing on/off control of the switching element by comparing the current command thus calculated with the input current detected by the input current detector circuit.

It is thus possible to generate a current command similar to an input voltage based on the amplitude of a current command obtained through PI control per half cycle of the input voltage from the AC power supply. This makes it possible to provide a power supply unit which allows a bus voltage to follow a reference voltage command while keeping the variation in the bus voltage within a predetermined range regardless of load size.

The control circuit zero-clears the amplitude of a current command calculated through the PI control and the integral term for the half cycle in case the difference between the reference voltage command and the voltage of the capacitor detected by the DC voltage detector circuit has exceeded a predetermined tolerance.

Thus, it is possible to provide a power supply unit which can suppress an increase in the bus voltage even in the absence of an impact load or a sudden change in the magnitude of the input voltage.

A power supply unit of the invention comprises an output current detector circuit for detecting an output current of the inverter, an output voltage detector for detecting an output voltage of the inverter, an output power detector for inputting an output current from the current detector circuit and an output voltage from the output voltage detector and calculating an output power, and an input power detector for inputting an input current from the input current detector circuit and an input voltage from the input voltage detector circuit and calculating an input power, characterized in that when the difference between the output power and the input power exceeds the predetermined value, the controller circuit divides the difference between the output power and the input power by the rms value of input voltage to calculate a correction term and adds the correction term to the integral term obtained through PI control.

This makes it possible to provide a power supply unit which instantaneously gives a better response to a current command and assures a stable bus voltage even in the presence of an impact load.

A method for generating a switching signal of the invention is a method for generating a switching signal for performing on/off control of the switching element in a converter including a diode bridge and a switching element for converting an AC power to a DC power, characterized in that the method comprises a step of calculating, through PI control, the amplitude of a current command per half cycle of the input voltage at a point in time where the sign of the input voltage from the AC power supply changes based on the difference between the reference voltage command and the voltage of the capacitor, a step of dividing the difference between the output power and the input power by an rms value of input voltage to calculate a correction term and adding the correction term to the integral term obtained through PI control when the difference between the output power from the inverter for converting a DC power to an AC power and the input power from the AC power supply exceeds a predetermined value, a step of calculating a normalized current command by dividing the amplitude of the current command by the peak value of the last input voltage and multiplying the resulting value by the input voltage from the AC power supply, and a step of generating a switching signal for performing on/off control of the switching element by comparing the current command thus calculated with the input current detected by the input current detector circuit. It is thus possible to stably control the bus voltage.

BEST MODE FOR CARRYING OUT THE INVENTION

Embodiment 1

Figure 1:
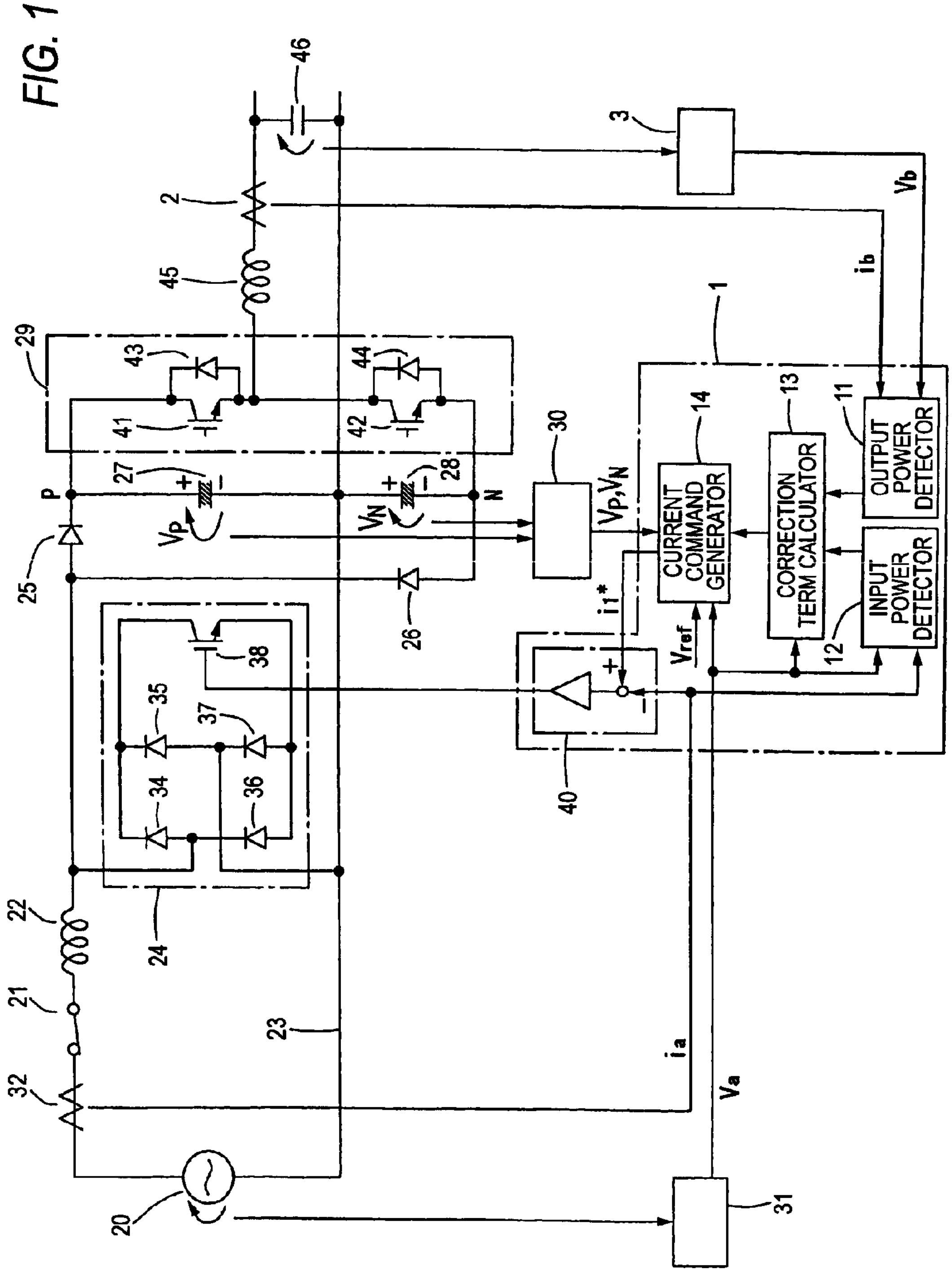
FIG. 1 shows the configuration of a power supply unit according to Embodiment 1 of the invention.

FIG. 1 shows the configuration of a power supply unit according to Embodiment 1 of the invention. In FIG. 1, numerals 20 through 32, 34 through 37, 40, and 41 through 46 are the same as those in FIG. 7, so that the corresponding description is omitted.

A numeral 1 represents a controller, 2 an output current detector circuit for detecting the output current of the inverter 29, 3 an output voltage detector for detecting the output voltage of the inverter 29, 11 an output power detector for inputting the output current from the output current detector circuit 2 and the output voltage from the output voltage detector and calculating an output power, 12 an input power detector for inputting an input voltage from the input voltage detector circuit 31 and an input current from the current detector circuit 32 and calculating an input power, 13 a correction term calculator, and 14 a current command generator.

A sign $V_a$ represents an input voltage detection value detected by the input voltage detector circuit 31, $V_{ref}$ a reference voltage command, $V_P$, $V_N$ bus voltage detection values output from the bus voltage detector circuit 30, $i_a$ an input current detection value detected by the current detector circuit 32, $V_b$ an output voltage detection value output from the output voltage detector 3, $i_b$ an output current detection value output from the current detector circuit 2, and $i_1^*$ a current command output from the current command generator 14.

The current command generator 14 generates a current command $i_1^*$ based on the reference voltage command $V_{ref}$, the input voltage detection value $v_a$ detected by the input voltage detector circuit 31, and the bus voltage detection value $V_P$ (or $V_N$) detected by the bus voltage detector circuit 30, and amplifies the current command $i_1^*$ up to the same range as the input current detection value $i_a$ by using an amplifier (not shown). The comparator 40 compares the amplified current command $i_1^*$ with the input current detection value $i_a$ detected by the current detector circuit 32 and determines a switching signal for turning on/off the gate of the switching element 38.

Figure 2:
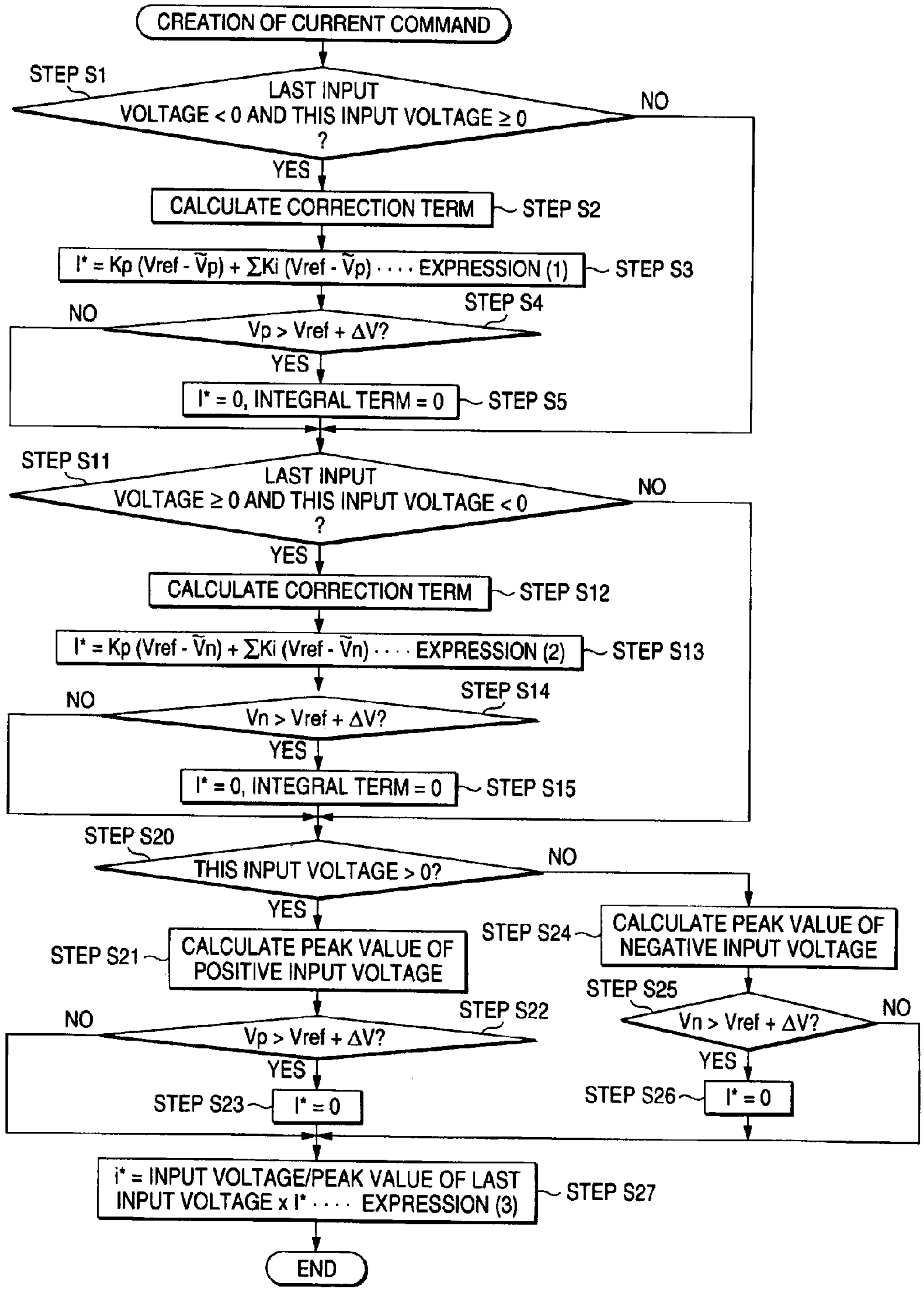
FIG. 2 is a flowchart of a current command generating procedure of a power supply unit according to Embodiment 1 of the invention.

FIG. 2 is a flowchart of a current command generating procedure of a power supply unit according to Embodiment 1 of the invention. In FIG. 2, steps S1 through S15 correspond to arithmetic operation of a current command, steps S20 through S27 correspond to arithmetic operation of a current command.

Figure 3:
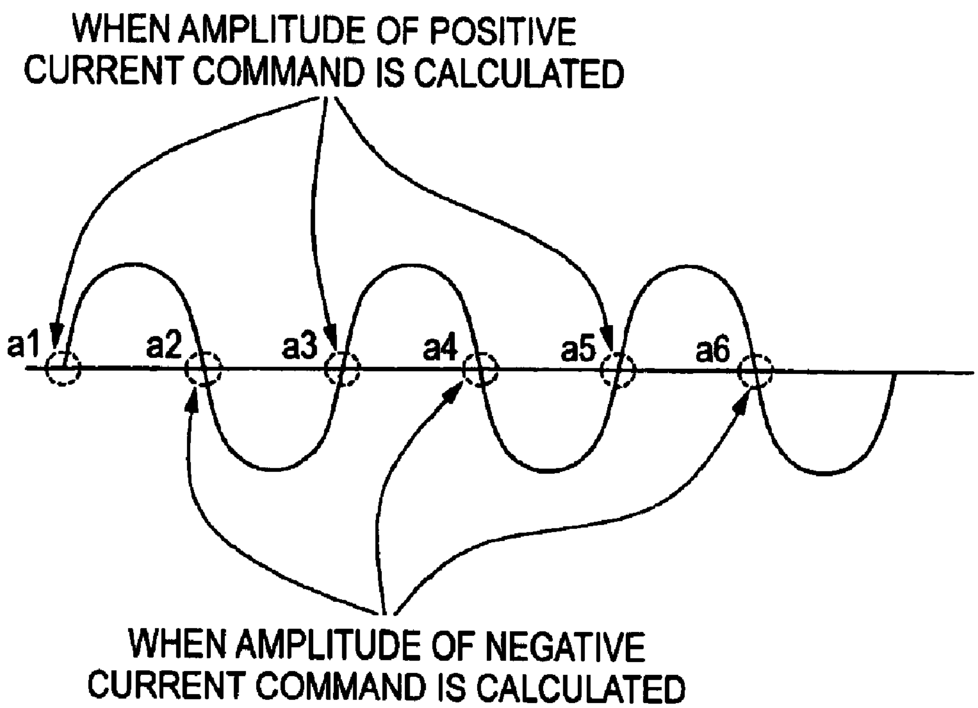
FIG. 3 shows a relationship between the waveform of the input voltage of a power supply unit according to Embodiment 1 of the invention and points in time of calculation of the amplitude of a current command.

FIG. 3 shows a relationship between the waveform of the input voltage of a power supply unit according to Embodiment 1 of the invention and points in time of calculation of the amplitude of a current command. In FIG. 3, a1, a3, a5 are points in time where the amplitude of a positive current command is calculated, while a2, a4, a6 are points in time where the amplitude of a negative current command is calculated.

Figure 4:
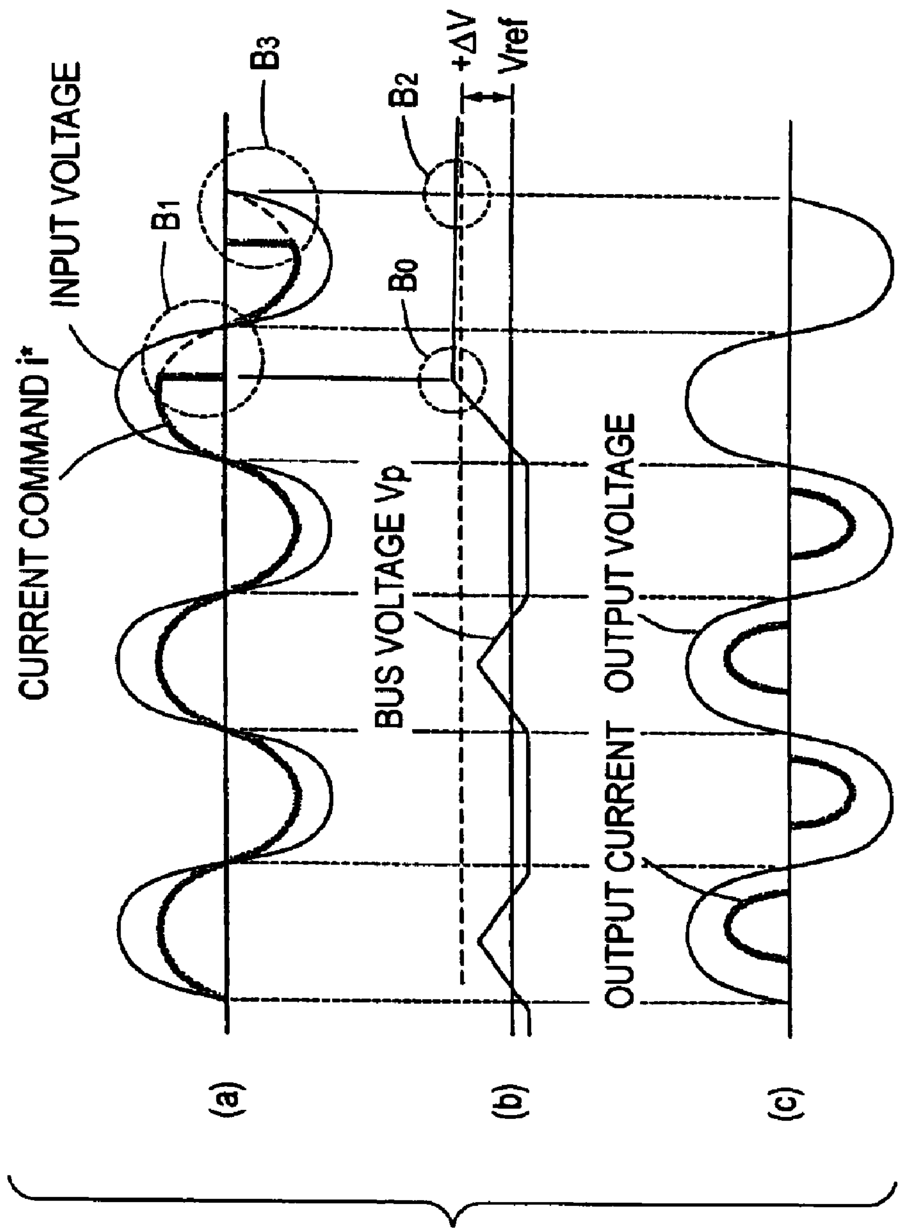
FIG. 4 shows a relationship between the input voltage of a power supply unit according to Embodiment 1 of the invention and the current command.

FIG. 4 shows a relationship between the input voltage of a power supply unit according to Embodiment 1 of the invention and the current command. FIG. 4A shows a relationship between an input voltage and a current command. FIG. 4B shows a relationship between a reference voltage command and a positive bus voltage $V_P$. FIG. 4C shows a relationship between an output current and an output voltage. In the example of FIG. 4, in case the instantaneous value $V_P$ of bus voltage has exceeded the allowable range of reference voltage command ($V_{ref}+\Delta V$) (Point $B_0$ in FIG. 4B), the amplitude I* of the current command is set to zero for the half cycle (Point $B_1$ in FIG. 4A). The negative bus voltage $V_N$ is the same as the positive bus voltage $V_P$ and the corresponding description is omitted.

A procedure for generating a current command in a power supply unit according to Embodiment 1 will be explained referring to FIGS. 1 through 4.

In step S1, the current command generator 14 determines an input voltage detection value $V_a$ input from the input voltage detector circuit 31. The input voltage detection value read last time (hereinafter referred to as the last input voltage) is compared with the input voltage detection value read this time (hereinafter referred to as this input voltage) and unless the last input voltage<0 and this input voltage≧0, execution proceeds to step S11.

In case the last input voltage<0 and this input voltage≧0 (points in time a1, a3, a5 where the sign of the input voltage detection value $V_a$ changes from negative to positive in FIG. 3) in Step S1, execution proceeds to step S2 where a correction term explained in FIG. 7 described later is calculated, and in step S3, the following expression (1) is used to generate the amplitude I* of a current command through PI control based on the reference voltage command $V_{ref}$ and the value $V\sim_P$ obtained by removing the noise after a primary delay filter from the bus voltage detection value:

$$I^*=K_P(V_{ref}-V\sim_P)+\Sigma K_i(V_{ref}-V\sim_P) \quad (1)$$

where $K_P$ is a proportional gain and $K_i$ is an integral gain.

In step S4, the instantaneous value $V_P$ of the bus voltage and the reference voltage command $V_{ref}$ are compared with each other. In case $V_P \leqq V_{ref}+\Delta V$ (where $\Delta V$ is a permissible level), execution proceeds to step S11.

In case $V_P>V_{ref}+\Delta V$ ($B_0$ in FIG. 4B) is determined in step S4, the amplitude I* of the current command generated using Expression (1) in step S3 is zero-cleared in step S5 ($B_1$ in FIG. 4A) and the integral term in the second term of the right side of Expression (1) is zero-cleared. Execution then proceeds to step S11.

In step S11, the last input voltage and this input voltage are compared with each other. Unless the last input voltage≧0 and this input voltage<0, execution proceeds to step S20.

In case the last input voltage≧0 and this input voltage<0 (points in time a2, a4, a6 where the sign of the input voltage detection value changes from positive to negative in FIG. 3) in Step S12, execution proceeds to step S12 where a correction term explained in FIG. 7 described later is calculated, and in step S13, the following expression (2) is used to generate the amplitude I* of a current command through PI control based on the reference voltage command $V_{ref}$ and the value $V\sim_N$ obtained by removing the noise after a primary delay filter from the bus voltage detection value:

$$I^*=K_P(V_{ref}-V\sim_N)+\Sigma K_i(V_{ref}-V\sim_N) \quad (2)$$

where $K_P$ is a proportional gain and $K_i$ is an integral gain.

In step S14, the instantaneous value $V_N$ of the bus voltage and the reference voltage command $V_{ref}$ are compared with each other. In case $V_N \leqq V_{ref}+\Delta V$ (where $\Delta V$ is a permissible level), execution proceeds to step S20.

In case $V_N > V_{ref}+\Delta V$ is determined in step S14, the amplitude I* of the current command generated using Expression (2) in step S13 is zero-cleared in step S15 and the integral term in the second term of the right side of Expression (2) is zero-cleared. Execution then proceeds to step S20.

The current command generator 14 in a power supply unit according to Embodiment 1 of the invention calculates the amplitude of a positive current command at points in time (a1, a3, a5 in FIG. 3A) where the sign of the input voltage detection value changes from negative to positive in step S3, and calculates the amplitude of a negative current command at points in time (a2, a4, a6 in FIG. 3A) where the sign of the input voltage detection value changes from positive to negative in step S13. In this way, the current command generator 14 generates a current command at a point in time where the sign of an input voltage changes, twice per cycle of the input voltage (FIG. 3A).

In a steady state, the average power of each of the positive and negative loads is constant. By calculating the amplitude I* of a current command per half cycle, it is possible to generate an amplitude I* of a stable current command free from the influence caused by a variation in the load in a half cycle, and allow a bus voltage to follow a reference voltage command while keeping the variation in the bus voltage within a predetermined range independently of load.

Steps S4 and S14 are used to check whether an instantaneous value $V_P$, $V_N$ is within the allowable range ($V_{ref}+\Delta V$) of the reference voltage command. In case the instantaneous value $V_P$, $V_N$ has exceeded the allowable range of the reference voltage command ($V_P > V_{ref}+\Delta V$, $V_N > V_{ref}+\Delta V$), the amplitude I* of the current command generated using Expression (1) or (2) in step S5 or Sl5 and the integral term are zero-cleared.

In case the bus voltage has substantially increased, the amplitude I* of the current command is zero-cleared and the switching element 38 is turned off to suppress the increase in the bus voltage.

In step S20, whether the input voltage is positive or negative is determined. In case the input voltage is negative, execution proceeds to step S24.

In case it is determined that the input voltage is positive in step 20, the peak positive value of the input voltage is calculated in step S21.

In step S22, the instantaneous value $V_P$ of the bus voltage and the reference voltage command $V_{ref}$ are compared with each other. In case $V_P \leqq V_{ref}+\Delta V$ (where $\Delta V$ is a permissible level), execution proceeds to step S27.

In case $V_P > V_{ref}+\Delta V$ in step S22, the amplitude I* of the current command generated using Expression (1) is zero-cleared in step S23. Execution proceed to step S27, where the current command i* is generated.

In case it is determined that the input voltage is negative in step S20, the peak negative value of the input voltage is calculated in step S24.

In step S25, the instantaneous value $V_N$ of the bus voltage and the reference voltage command $V_{ref}$ are compared with each other. In case $V_N \leqq V_{ref}+\Delta V$ (where $\Delta V$ is a permissible level), execution proceeds to step S27.

In case $V_N > V_{ref}+\Delta V$ in step S25, the amplitude I* of the current command generated using Expression (2) is zero-cleared in step S26. Execution proceed to step S27, where the current command i* is generated.

In step S27, the following expression (3) is used to normalize the current command by dividing the instantaneous value of the input voltage by the peak value $V_{peak}$ of the last input voltage to generate a current command i*:

$$i^* = (\text{instantaneous value of input voltage/peak value of last input voltage}) \times I^* \quad (3)$$

In Expression (3), I* and $V_{peak}$ are fixed value for a half cycle, so that it is possible to generate a current command i* proportional to the input voltage thus providing a current command i* whose input power factor is 1.

In steps S22, S23, S25 and S26, in case the instantaneous value $V_P$, $V_N$ of the bus voltage has exceeded the allowable range of the reference voltage command ($V_{ref}+\Delta V$), the amplitude of the current command is zero-cleared for the half cycle. It is thus possible to suppress an increase in the bus voltage even in the absence of an impact load or in case the magnitude of the input voltage has suddenly changed. Once the instantaneous value $V_P$, $V_N$ of the bus voltage has exceeded the allowable range of the reference voltage command ($V_{ref}+\Delta V$) due to a variation in the input voltage or load, clearing the integral term will result in a substantial time until the amplitude of the current command is sufficiently great. In order to prevent possible variation in the bus voltage, the integral term is not cleared in steps S23 and S26. The integral term is cleared only when the input voltage shown at points in time a1 through a6 in FIG. 3 crosses zero (steps S5 and S15 in FIG. 2).

Figure 5:
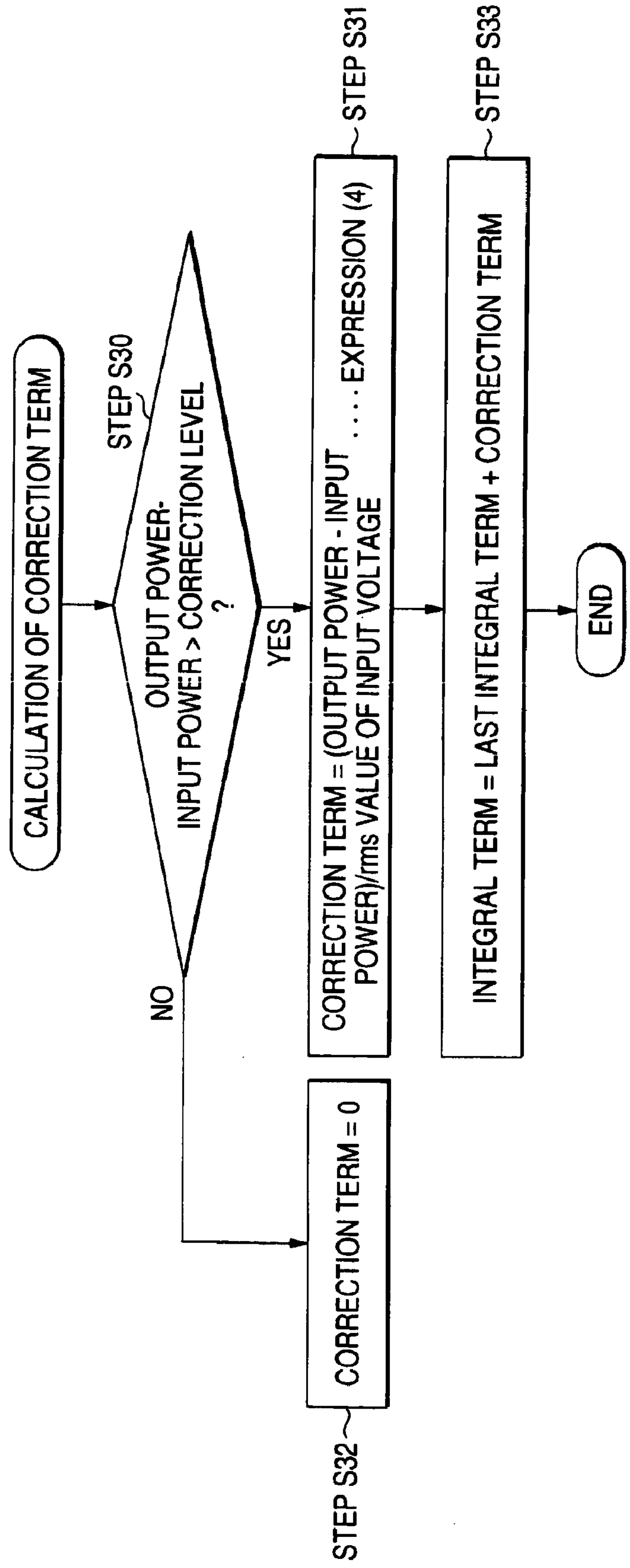
FIG. 5 is a flowchart showing calculation of a correction term in a power supply unit according to Embodiment 1 of the invention.

FIG. 5 is a flowchart of calculating a correction term in a power supply unit according to Embodiment 1 of the invention. This is a detailed flowchart showing the calculation of the correction term in steps S2 and S12 in FIG. 2.

Figure 6:
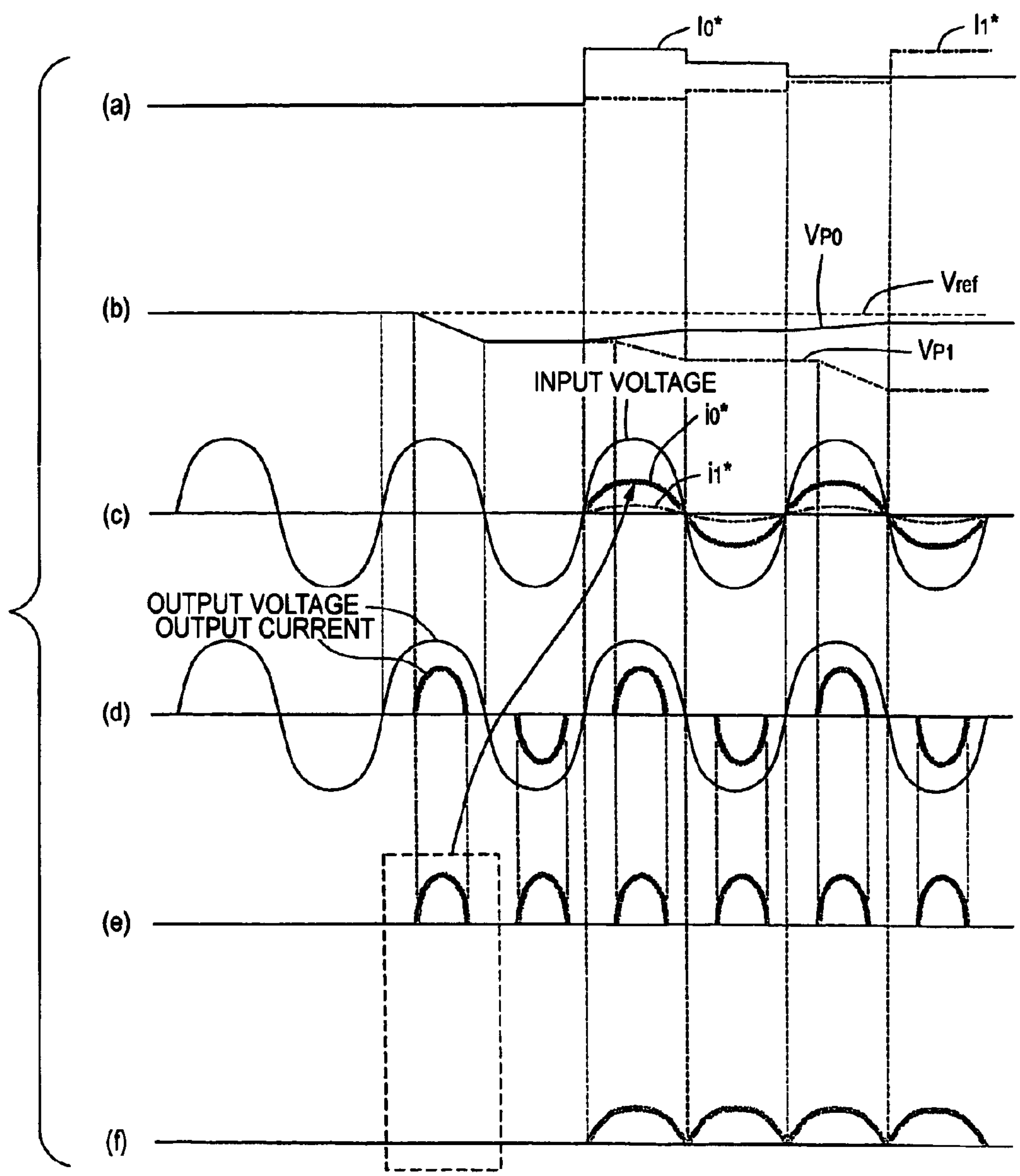
FIG. 6 shows a relationship between the waveform of the input voltage of a power supply unit according to Embodiment 1 of the invention and calculation of the amplitude of a current command.

FIG. 6 shows a relationship between the waveform of the input voltage of a power supply unit according to Embodiment 1 of the invention and calculation of the amplitude of a current command. FIG. 6A shows the waveform of a current command. FIG. 6B shows the waveform of a bus voltage. FIG. 6C shows the waveforms of an input voltage and current command. FIG. 6D shows waveforms of an output voltage and an output current. FIG. 6E shows the waveform of an output power. FIG. 6F shows the waveform of an input power. In FIG. 6, $I_0$* is a corrected amplitude of a current command, $I_1$* an uncorrected amplitude of a current command, $i_0$* a corrected current command, $i_1$* an uncorrected current command, $V_{ref}$ a reference voltage command, $V_{P0}$ a corrected bus voltage, and $V_{P1}$ an uncorrected bus voltage.

The correction processing in generating a current command in a power supply unit according to Embodiment 1 of the invention will be described using FIGS. 2, 5 and 6.

Figure 7:
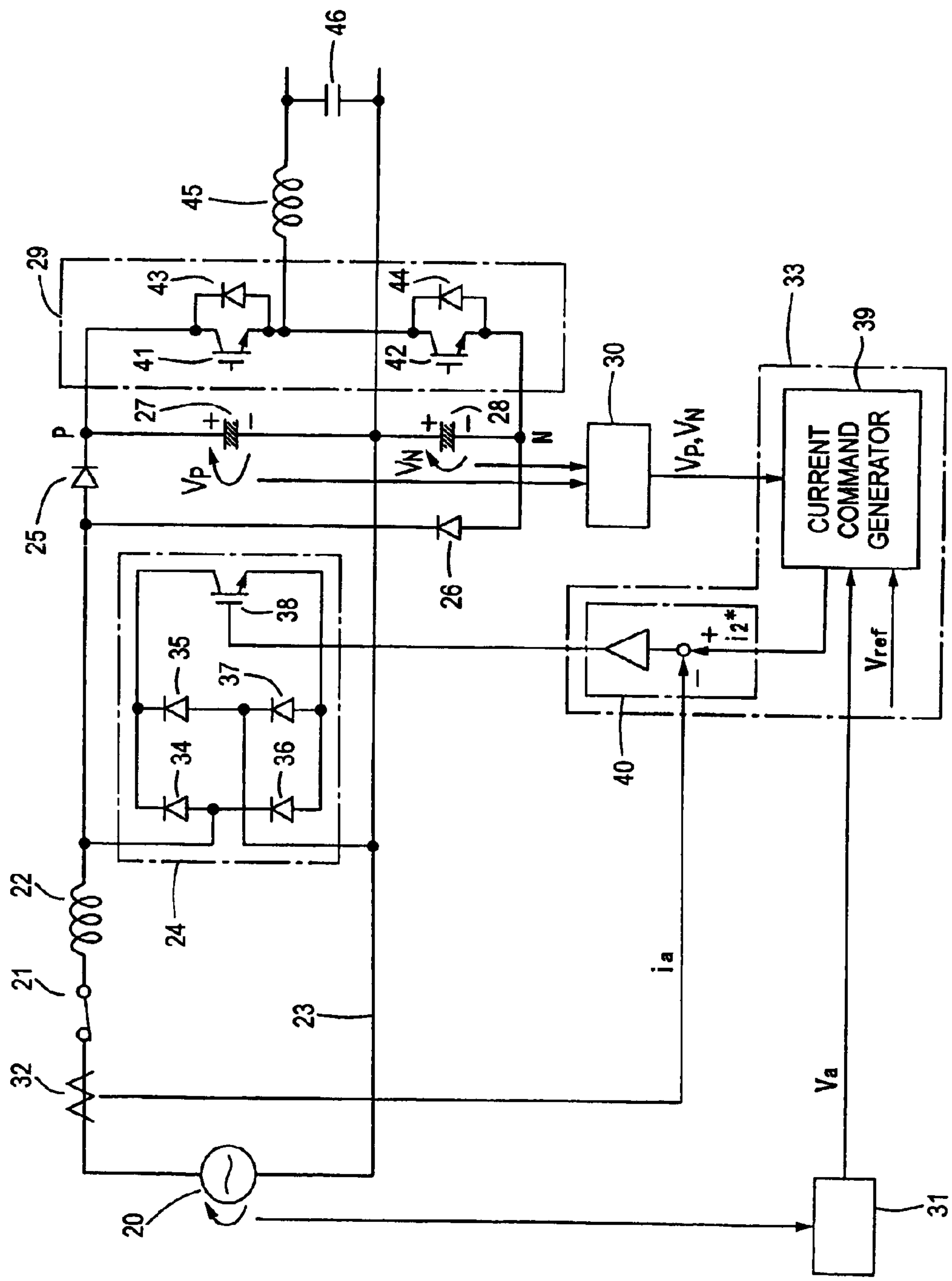
FIG. 7 shows the configuration of a related art power supply unit.
Figure 8:
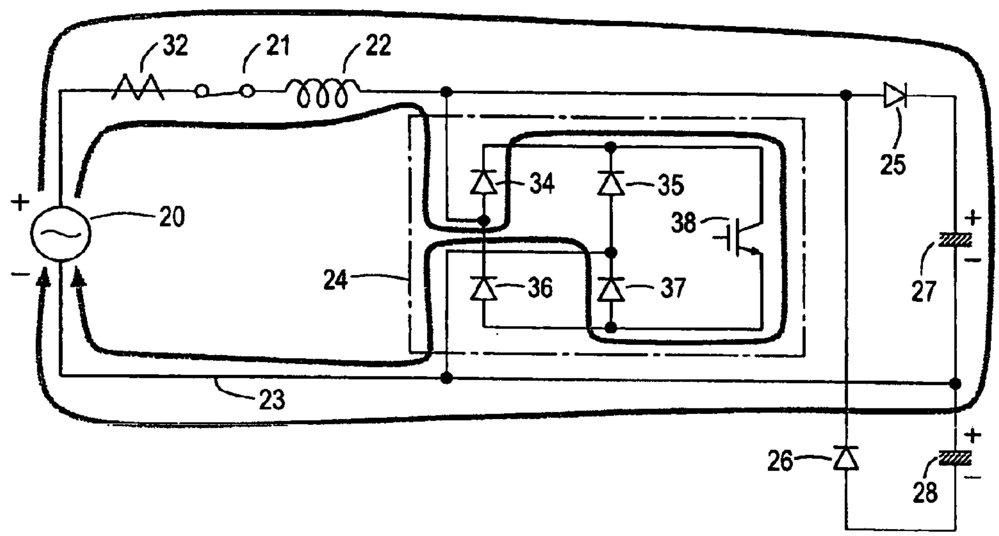
FIG. 8 explains an operation of recharging a capacitor 27 in a conventional power supply unit with a positive AC power supply 20.
Figure 9:
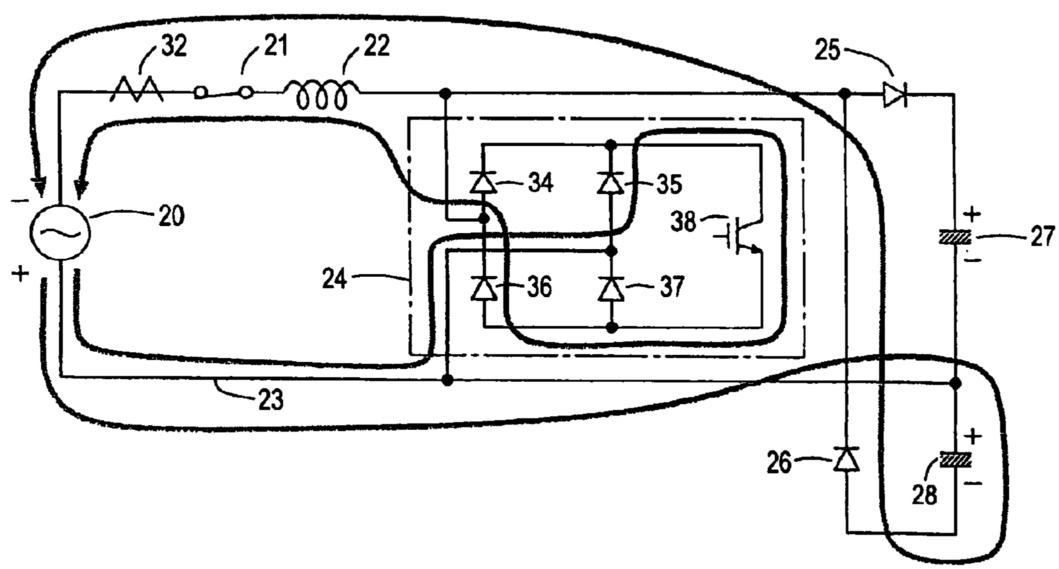
FIG. 9 explains an operation of recharging a capacitor 27 in a conventional power supply unit with a negative AC power supply 20.
Figure 10:
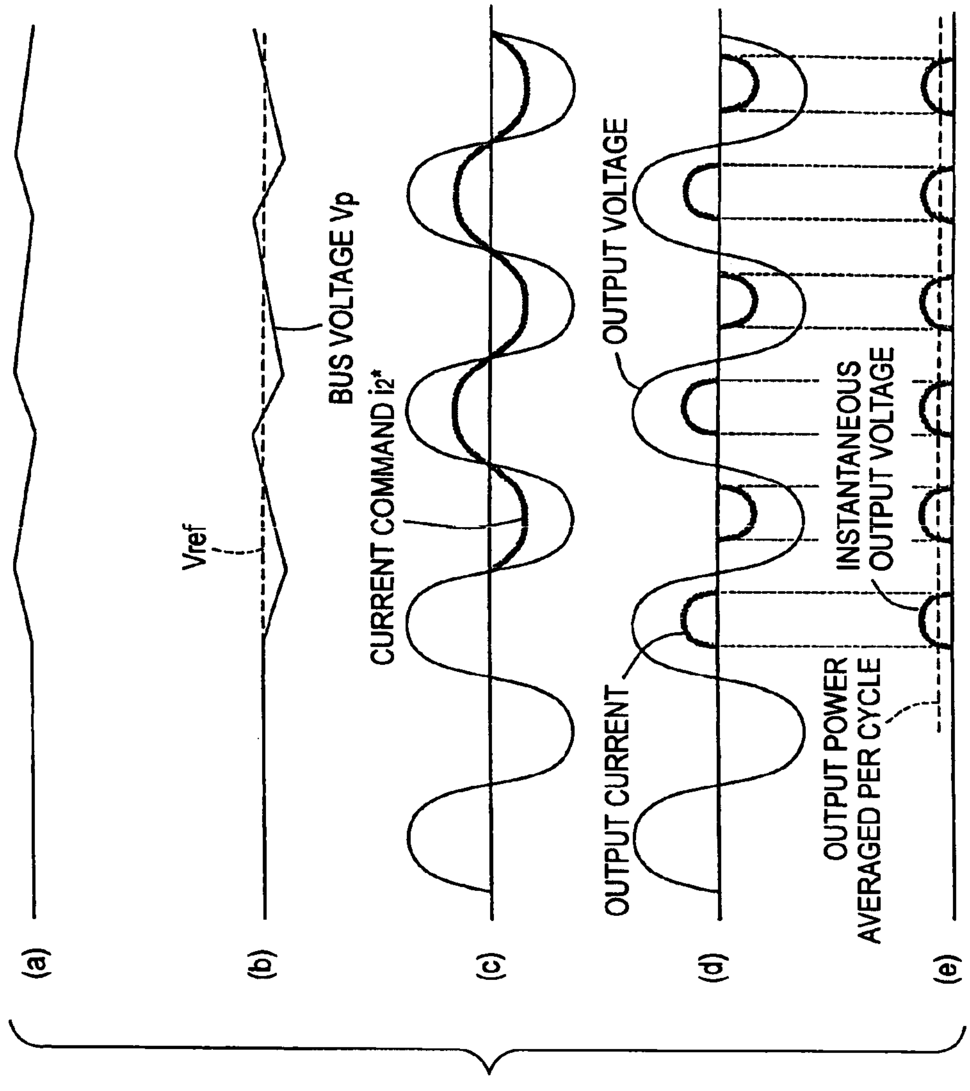
FIG. 10 shows various waveforms in a conventional power supply unit with a light load applied.
Figure 11:
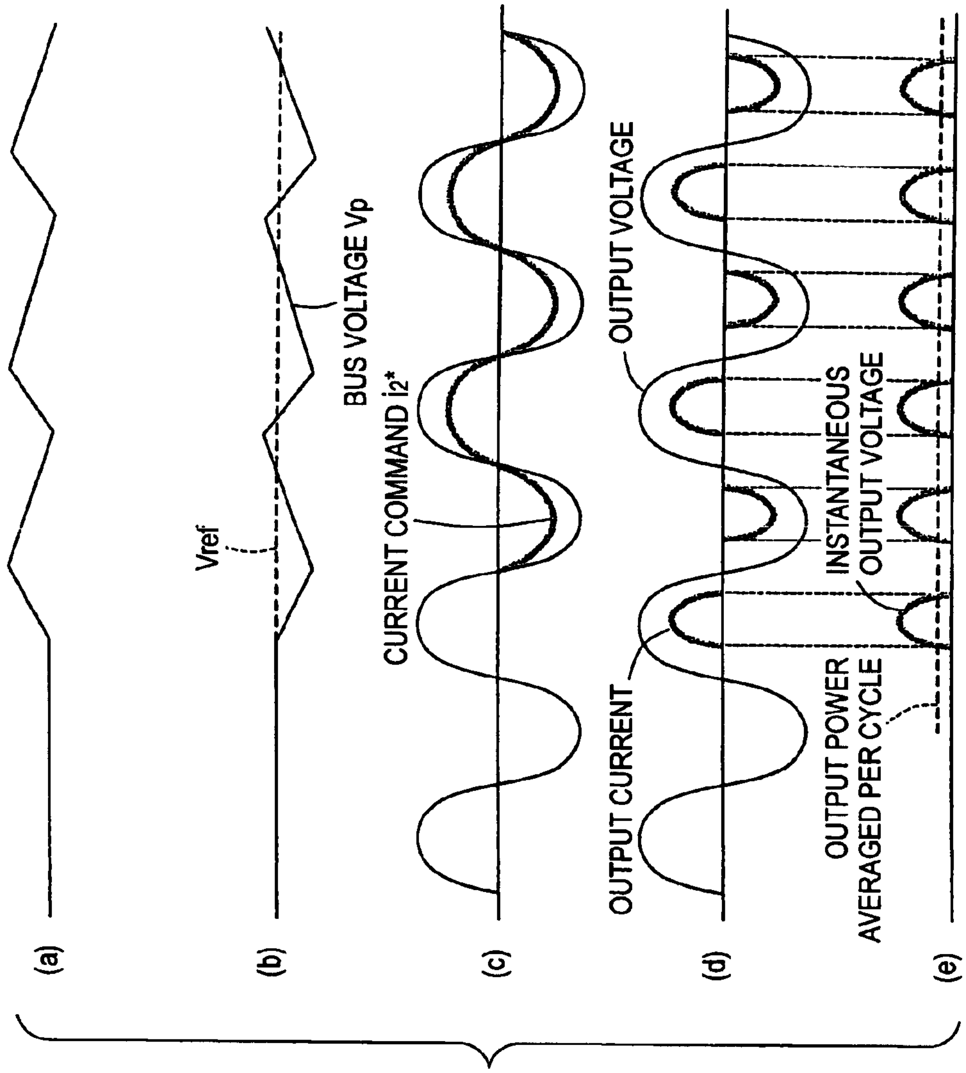
FIG. 11 shows various waveforms in a conventional power supply unit with a heavy load applied.

A correction term calculator 13 calculates the correction terms shown in FIG. 7 at a point in time where the sign of the input voltage changes from negative to positive (a1, a3, a5 in FIG. 3A) or from positive to negative (a2, a4, a6 of FIG. 3A).

In FIG. 5, the input power $W_{in}$ output from the input power detector 12 is compared with the output power $W_{out}$ output from the output power detector 11 in step S30. In case the difference between the output power and the input power exceeds a correction level, a drop in the bus voltage due to an impact load is calculated as a correction terms by using the following expression (4) in step S31, then execution proceed to step S33:

$$\text{Correction terms} = \sqrt{2} \times (W_{out} - W_{in}) / V_{rms} \quad (4)$$

where $V_{rms}$ is an rms value of input voltage.

In case it is determined that the difference between the output power and the input power is equal to or below the correction level in Step 30, the correction term is zero-cleared in step S32, and execution proceeds to step S33.

In step S33, the correction term calculated in step S31 or S32 is added to the last integral term in Expression (1) or (2) to calculate the amplitude of a current command.

Assume that the proportional gain $K_P$ or integral gain $K_i$ of Expression (1) or (2) to calculate the amplitude I* of a current command through PI control is set to a gain stabilized under a predetermined load. An impact load will cause the bus voltage to drop substantially as shown by $V_{P1}$ in FIG. 6B, the integral term to increase, and the amplitude I* of the current command to increase gradually as shown by $I_1$* in FIG. 6A due to a small gain, thereby delaying recovery of the bus voltage.

By increasing the proportional gain $K_P$ or integral gain $K_i$ above a gain stabilized under a predetermined load to improve the response of the amplitude I* of a current command assumed when an impact load is applied, it is possible to suppress a drop in the bus voltage assumed when an impact load is applied. However, in case the response is improved in excess, the bus voltage is more likely to vibrate, so that it is difficult to perform optimum gain adjustment for the system considering an impact load.

In case the difference between the output power and the input power has exceeded a correction level as shown in FIG. 5 described above, the drop in the bus voltage caused by an impact load is calculated as a correction term, which is added to the integral term in Expression (1) or (2). This makes it possible to instantaneously increase the amplitude of a current command and improve the load response even in the presence of an impact load while the proportional gain $K_P$ or integral gain $K_i$ in PI control shown in Expression (1) or (2) is set to a gain stabilized under a predetermined load, thereby suppressing a drop in the bus voltage.

In order to improve a response until the integral term for PI control to obtain the amplitude of a current command on a variation in the load or power supply, or switchover of control, that is, switchover from backup operation where the bus voltage is boosted from a battery (not shown) or bypass operation where the input power supply is output with a relay, to operation where the bus voltage is boosted by the AC power supply input, the difference between the input power and the output power is used to calculate the shortfall of the current command and the shortfall is covered as a correction term for the integral term for PI control. This minimizes the drop in the bus voltage.

While the output voltage is synchronized with the input voltage in the foregoing example, processing to perform arithmetic operation per zero crossing of input voltage has a similar effect even in case the output voltage is not synchronized with the input voltage.

INDUSTRIAL APPLICABILITY

As mentioned hereinabove, a power supply unit or a method for generating a switching signal for performing on/off control of a switching element in a converter of a power supply unit of the invention can suppress a variation in the bus voltage within a predetermined range and stabilize the bus voltage even on a variation in the load or power supply, or switchover of control, that is, switchover from backup operation where the bus voltage is boosted from a battery (not shown) or bypass operation where the input power supply is output with a relay, to operation where the bus voltage is boosted by the AC power supply input. Thus the method is fit for an interruptible power supply system which feeds AC power to a load at instantaneous power failure.

What is claimed is:

1. A power supply unit comprising:

a converter including a diode bridge and a switching element for converting an AC power to a DC power, a step-up reactor which comprises, together with the converter, a step-up chopper circuit, and a capacitor for recharging a DC voltage boosted by said step-up chopper circuit, a control circuit for performing on/off control of said switching element, and an inverter for converting a DC power to an AC power, an input current detector circuit for detecting the input current of an AC power supply, an input voltage detector for detecting the input voltage of the AC power supply, and a DC voltage detector circuit for detecting the voltage of said capacitor, wherein said control circuit calculates, through PI control, the amplitude of a current command per half cycle of said AC power supply at a point in time where a sign of the input voltage from said AC power supply changes based on the difference between a reference voltage command and the voltage of said capacitor, calculates a normalized current command by dividing the amplitude of the current command by the peak value of the last input voltage and multiplying the resulting value by the input voltage from said AC power supply, and generates a switching signal for performing on/off control of said switching element by comparing the current command thus calculated with the input current detected by said input current detector circuit.

2. The power supply unit as claimed in claim 1, wherein said control circuit zero-clears the amplitude of a current command calculated through said PI control and an integral term in case the difference between the reference voltage command and the voltage of the capacitor detected by said DC voltage detector circuit exceeds a predetermined tolerance.

3. A power supply comprising:

an inverter, an output current detector circuit for detecting an output current of said inverter, an output voltage detector for detecting an output voltage of said inverter, an output power detector for inputting an output current from said output current detector circuit and an output voltage from said output voltage detector and calculating an output power, an input power detector for inputting an input current from an input current detector circuit and an input voltage from an input voltage detector circuit and calculating an input power, and a controller circuit, wherein said controller circuit divides the difference between the output power and the input power by an rms value of input voltage to calculate a correction term and adds the correction term to said integral term obtained through PI control, when the difference between the output power and the input power exceeds a predetermined value.

4. A method for generating a switching signal for performing on/off control of a switching element in a converter including a diode bridge and said switching element for converting an AC power from an AC supply to a DC power, wherein said method comprises:

calculating, through PI control, an amplitude of a current command per half cycle of said AC power supply at a point in time where a sign of the input voltage from said AC power supply changes based on the difference between a reference voltage command and the voltage of said capacitor, dividing the difference between said output power and said input power by an rms value of input voltage to calculate a correction term and adding the correction term to said integral term obtained through PI control when the difference between the output power from the inverter for converting a DC power to an AC power and the input power from the AC power supply exceeds a predetermined value, calculating a normalized current command by dividing the amplitude of the current command by the peak value of the last input voltage and multiplying the resulting value by the input voltage from said AC power supply, and generating a switching signal for performing on/off control of said switching element by comparing the current command thus calculated with the input current detected by said input current detector circuit.

* * * * *